(12) United States Patent
Shu

(10) Patent No.: US 12,398,870 B1
(45) Date of Patent: Aug. 26, 2025

(54) PROJECTION DEVICE

(71) Applicant: Jinbo Shu, Zhejiang (CN)

(72) Inventor: Jinbo Shu, Zhejiang (CN)

( * ) Notice: Subject to any disclaimer, the term of this patent is extended or adjusted under 35 U.S.C. 154(b) by 0 days.

(21) Appl. No.: 19/003,687

(22) Filed: Dec. 27, 2024

(30) Foreign Application Priority Data

Dec. 4, 2024 (CN) .......................... 202422991728.7

(51) Int. Cl.
*F21V 21/116* (2006.01)
*F21S 8/08* (2006.01)
*F21V 21/08* (2006.01)
*G03B 21/14* (2006.01)

(52) U.S. Cl.
CPC ............. *F21V 21/116* (2013.01); *F21S 8/081* (2013.01); *G03B 21/145* (2013.01); *F21V 21/0824* (2013.01)

(58) Field of Classification Search
CPC .......................... G03B 21/145; F21V 21/0824
See application file for complete search history.

(56) References Cited

U.S. PATENT DOCUMENTS

| | | | |
|---|---|---|---|
| 5,655,829 A * | 8/1997 | Lin | F21V 21/30 362/431 |
| 10,042,238 B1 * | 8/2018 | Zhang | G03B 21/003 |
| 10,145,520 B1 * | 12/2018 | Tang | F21V 21/0824 |
| 10,146,120 B1 * | 12/2018 | Zhang | G03B 21/001 |
| D1,005,550 S * | 11/2023 | Zhou | D26/63 |
| D1,032,066 S * | 6/2024 | Wang | D26/106 |
| D1,052,773 S * | 11/2024 | Wang | D26/63 |
| 2014/0211459 A1 * | 7/2014 | Toner | F21V 33/00 362/396 |
| 2016/0026073 A1 * | 1/2016 | Zhang | G03B 21/2033 353/101 |
| 2017/0082254 A1 * | 3/2017 | Zhang | A63H 27/10 |
| 2017/0219176 A1 * | 8/2017 | Chang | F21V 5/04 |
| 2017/0227200 A1 * | 8/2017 | Zhang | F21V 21/30 |
| 2018/0283663 A1 * | 10/2018 | Zhang | F21V 14/06 |

* cited by examiner

*Primary Examiner* — Alexander K Garlen
(74) *Attorney, Agent, or Firm* — HOWARD M COHN and Associates, LLC

(57) ABSTRACT

A projection device includes at least two projection lamps and a base. The base includes at least two connecting portions. The at least two connecting portions extend in different directions. At least one of the at least two projection lamps is disposed on each of the connecting portions. The base is allowed to mount the at least two projection lamps, thereby improving mounting efficiency and space utilization.

18 Claims, 12 Drawing Sheets

PROJECTION DEVICE

TECHNICAL FIELD

The present disclosure relates to a technical field of projection devices, and in particular to a projection device.

BACKGROUND

Projection devices adopt an optical projection principle and high-brightness light sources to project image structures (pattern or text content) on a projection element thereof onto a wall, floor or screen.

However, only one projection lamp is disposed on a base of a projection device in the related art. When an effect of multiple projection patterns is required, additional mounting bases are required to mount additional projection lamps, and each of the mounting bases occupies a certain mounting space. When mounting the projection lamps, mounting efficiency is reduced and a space utilization rate is low.

SUMMARY

The embodiments of the present disclosure provide a projection device, which realizes mounting of projection lamps on a base, thereby improving mounting efficiency and space utilization.

The projection device of the present disclosure comprises at least two projection lamps and a base.

The base comprises at least two connecting portions. The at least two connecting portions extend in different directions. At least one of the at least two projection lamps is disposed on each of the connecting portions.

In some embodiments, the base comprises a connecting piece and a fixing piece. The connecting piece comprises the at least two connecting portions and a mounting portion. The at least two connecting portions are connected to the mounting portion. The fixing piece is connected to one end of the mounting portion away from the at least two projection lamps. The fixing piece fixes the at least two projection lamps to a mounting surface or an external device.

In some embodiments, the at least two projection lamps are respectively rotatably connected to the at least two connecting portions.

In some embodiments, the at least two connecting portions comprise connection positions respectively connected to the at least two projection lamps. In a front-rear direction of the projection device, the connection positions are located on a same plane.

In some embodiments, the connecting piece further comprises spherical portions and mounting pieces, each of the spherical portions are connected to one end of a corresponding one of the at least two connecting portions. Each of the projection lamps comprises a housing, each housing define a mounting groove, and a groove wall of each mounting groove is spherical.

Each of the mounting pieces defines a through hole. An aperture of each through hole is less than an outer diameter of each of the spherical portions. Each of the mounting pieces is detachably connected to each housing to rotatably connect each of the spherical portions in each mounting groove. Each of the connecting portions extends outward from each through hole.

In some embodiments, the connecting piece comprises a main body portion and hemispherical coves. The main body portion comprises the mounting portion, the at least two connecting portions, and hemispherical portions respectively connected to the at least two connecting portions. The hemispherical covers are respectively detachably connected to the hemispherical portions to form the spherical portions.

In some embodiments, the hemispherical covers are respectively connected to the hemispherical portions through screws.

In some embodiments, each housing comprises a housing body and arc-shaped connecting plates. The arc-shaped connecting plates thereof are disposed around and connected to an outer wall of the housing body thereof to define the mounting groove thereof.

The arc-shaped connecting plates are disposed at intervals, and a necking portion is disposed at one end of the arc-shaped connecting plates away from a corresponding housing, so that an outer diameter of an opening of each mounting groove is less than the outer diameter of each of the spherical portions. Arc-shaped limiting portions protruding inward are disposed on two opposite sides of an inner wall of each through hole.

In some embodiments, inner threads are disposed on the mounting pieces, outer threads are disposed on the arc-shaped connecting plates, and the inner threads are respectively screwed with the outer threads.

In some embodiments, each housing further comprises support ribs. The support ribs thereof are connected to the housing body thereof and inner walls of the arc-shaped connection plates thereof. Outer surfaces of the support ribs thereof are disposed in arc shapes to form the groove wall of each mounting groove.

In some embodiments, the fixing piece is a stake. The stake defines a mounting hole, and the mounting portion comprises support sheets. A first side of each of the support sheets is connected to first sides of other support sheets. Each two adjacent second sides of the support sheets defines an included angle. The support sheets are in interference fit with an inner wall of the mounting hole.

In some embodiments, the fixing piece is a fixing base, the fixing base defines a fixing surface, and the fixing surface is disposed on the mounting surface. A first rotating buckle is disposed on an outer wall surface of the mounting portion. The fixing portion defines an assembling hole. A second rotating buckle is disposed on a hole wall of the assembling hole. The mounting portion is at least partially inserted into the assembling hole. The first rotating buckle is engaged with the second rotating buckle by rotating.

In some embodiments, the fixing base comprises a fixing plate. The fixing plate defines the fixing surface and a fixing hole. A fastener is configured to pass through the fixing hole to fix the fixing plate to the mounting surface.

In some embodiments, each of the projection lamps comprises a housing, a lamp board, a projection element, and a projection lens. The housing thereof defines a mounting cavity and a light-transmitting hole. The light-transmitting hole thereof is communicated with the mounting cavity and an outside. The lamp board thereof is mounted in the mounting cavity thereof. The lamp board thereof comprises at least one light source. The projection element thereof is mounted in the mounting cavity thereof and is disposed in a light emitting direction of the at least one light source thereof. The projection lens thereof is mounted in the mounting cavity thereof and is disposed in the light emitting direction of the at least one light source thereof. Light emitted by the at least one light source thereof passes through the projection element thereof, the projection lens thereof and is emitted outward through the light-transmitting hole thereof.

In some embodiments, each of the projection lamps further comprises a spotlight cup mounted on the lamp board thereof and disposed in the light emitting direction of the at least one light source thereof. The projection element thereof is mounted on one side, away from the at least one light source, of the spotlight cup thereof.

In some embodiments, the projection element thereof is a projection film. Each of the projection lamps further comprises a pressing plate. The pressing plate thereof is fixedly connected to the spotlight cup thereof to press the projection element thereof on the spotlight cup thereof.

In some embodiments, the least one light source comprises light sources, and the projection element thereof comprises image structures. The projection lens thereof comprises focusing portions. The light sources are one-to-one corresponding to the image structures. The focusing portions are one-to-one corresponding to the light sources.

Each of the projection lamps further comprises a motor. A main body of the motor thereof is mounted on a rear portion of the lamp board thereof. A driving shaft of the motor thereof passes through the lamp board thereof and is rotatably connected to the projection lens thereof.

The light sources thereof, the image structures thereof, and the focusing portions thereof are circumferentially disposed in a circumferential direction of the driving shaft thereof.

In some embodiments, the connecting piece further comprises a first connecting arm. A middle portion of the first connecting arm is connected to the mounting portion, two opposite ends of the first connecting arm respectively form two connecting portions of the at least two connecting portions, and the first connecting arm is disposed in an arc shape.

In some embodiments, the connecting piece further comprises a second connecting arm. A first end of the second connecting arm is connected to a junction of the first connecting arm and the mounting portion, and a second end of the second connecting arm forms one connecting portion of the at least two connecting portions.

In some embodiments, first reinforcing ribs spaced apart from each other are disposed in at least one of an extending direction of the first connecting arm and an extending direction of the second connecting arm, and/or second reinforcing ribs spaced apart from each other are disposed in at least one of the extending direction of the first connecting arm and the extending direction of the second connecting arm.

In the projection device of the embodiments of the present disclosure, the base comprises the at least two connecting portions, and the at least two connecting portions extend in different directions, so that the at least two projection lamps are allowed to be mounted on one base, and different projection lamps are allowed to project at different positions and angles. Therefore, the projection device of the present disclosure achieves a wider projection coverage and meet various projection needs. Moreover, the at least two projection lamps generate brighter and clearer images, thereby improving projection quality. Further, projections projected by the at least two projection lamps are allowed to be superimposed to achieve richer colors and layering. In addition, only one base is needs for mounting and fixing of the projection device, and the at least two projection lamps are allowed to be disposed at required positions, which improves mounting efficiency and space utilization.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
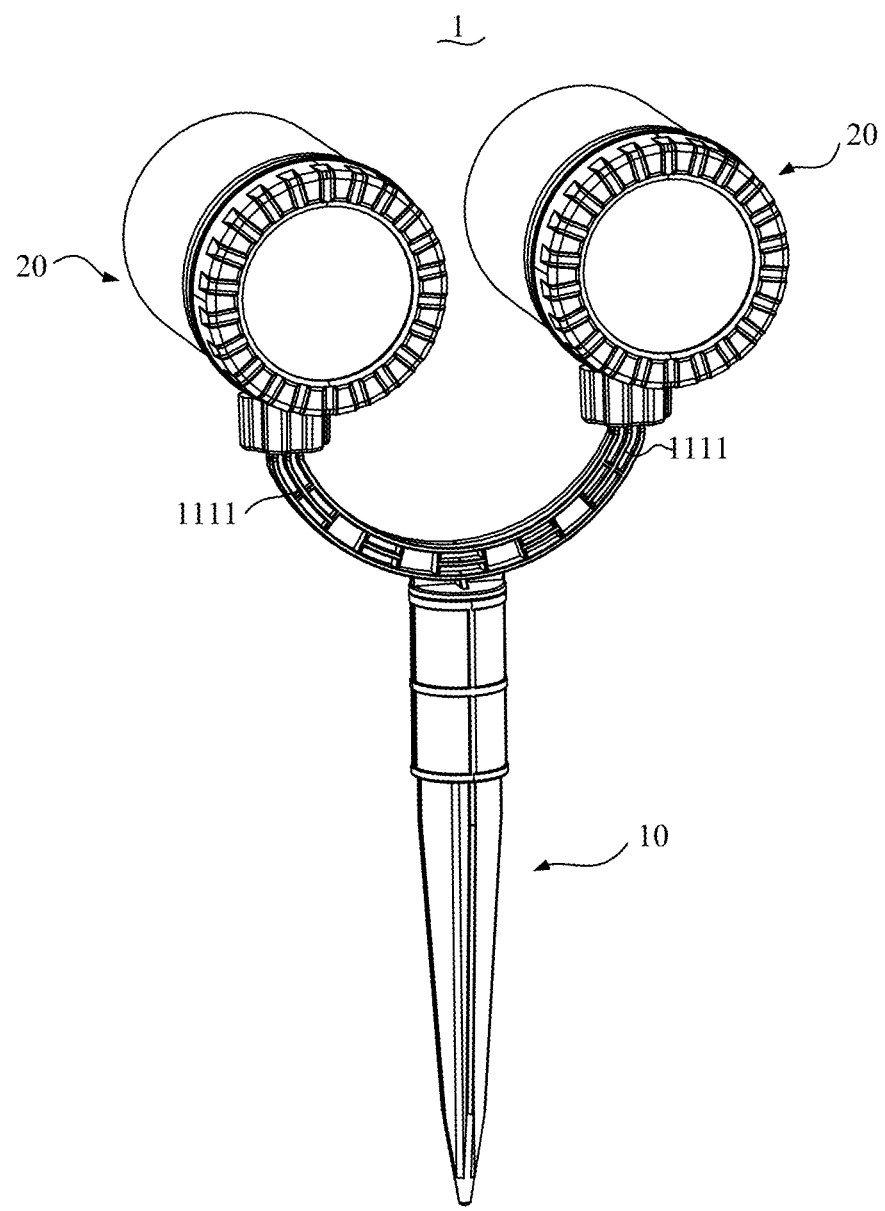
FIG. 1 is a schematic diagram of a projection device according to a first embodiment of the present disclosure.

In the drawings:
1—projection device; 10—base; 110—connecting piece; 111—main body portion; 1111—connecting portion; 1112—mounting portion; 1113—support sheet; 1114—first rotating buckle; 1115—first connecting arm; 1116—second connecting arm; 1117—first reinforcing rib; 1118—second reinforcing rib; 112—spherical portion; 1121—hemispherical portion; 1122—hemispherical cover; 120—fixing piece; 121—stake; 121a—mounting hole; 122—fixing base; 122a—assembling hole; 1221—fixing surface; 1222—fixing plate; 1230—fixing hole; 1240—second rotating buckle; 20—projection lamp; 210—housing; 210a—mounting groove; 210b—mounting cavity; 210 c—light-transmitting hole; 211—housing body; 212—arc-shaped connecting plate; 2121—necking portion; 213—supporting rib; 220—lamp board; 221—mounting plate 222—light source; 230—projection film; 240—projection lens; 2401—focusing portion; 250—spotlight cup; 260—pressing plate; 270—motor; 280—sealing glass plate; 290—sealing ring; 30—mounting piece; 30a—through hole; 310—arc-shaped limiting portion.

Realization of purposes, functional features, and advantages of the present disclosure is further explained in conjunction with embodiments and with reference to the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include at least one feature. Unless otherwise indicated, the term "a plurality of" means two or more. The term "and/or" depict relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" includes any and all combinations of one or more of the associated listed items.

As shown in FIGS. 1-7, the present disclosure provides a projection device 1. The projection device 1 of the present disclosure comprises at least two projection lamps 20 and a base 10. The base 10 is configured to support and fix the at least two projection lamp 20 to ensure that the at least two projection lamps 20 are able to stably project images. The base 10 comprises at least two connecting portions 1111. The at least two connecting portions 1111 extend in different directions. At least one of the at least two projection lamps 20 is disposed on each of the connecting portions 1111. Since the at least two projection lamps 20 are respectively mounted on the at least two connecting portions 1111, and at least two connecting portions 1111 extend in different directions, the at least two projection lamps 20 are allowed to be mounted on one base 10, and the at least two projection lamps 20 are allowed to project at different positions and angles. Therefore, the projection device 1 of the present disclosure achieves a wider projection coverage and meets various projection needs. Moreover, the at least two projection lamps 20 generate brighter and clearer images, thereby improving projection quality. Further, projections projected by the at least two projection lamps 20 are allowed to be superimposed to achieve richer colors and layering. In addition, only one base 10 is needs for mounting and fixing of the projection device 1, and the at least two projection lamps 20 are allowed to be disposed at required positions, which improves mounting efficiency and space utilization. Furthermore, the at least two connecting portions 1111 of the present disclosure are detachably connected to at least two projection lamps 20. Therefore, a user is allowed to mount at least one of the at least two projection lamps 20 on at least one of the at least two connecting portions 1111.

Figure 2:
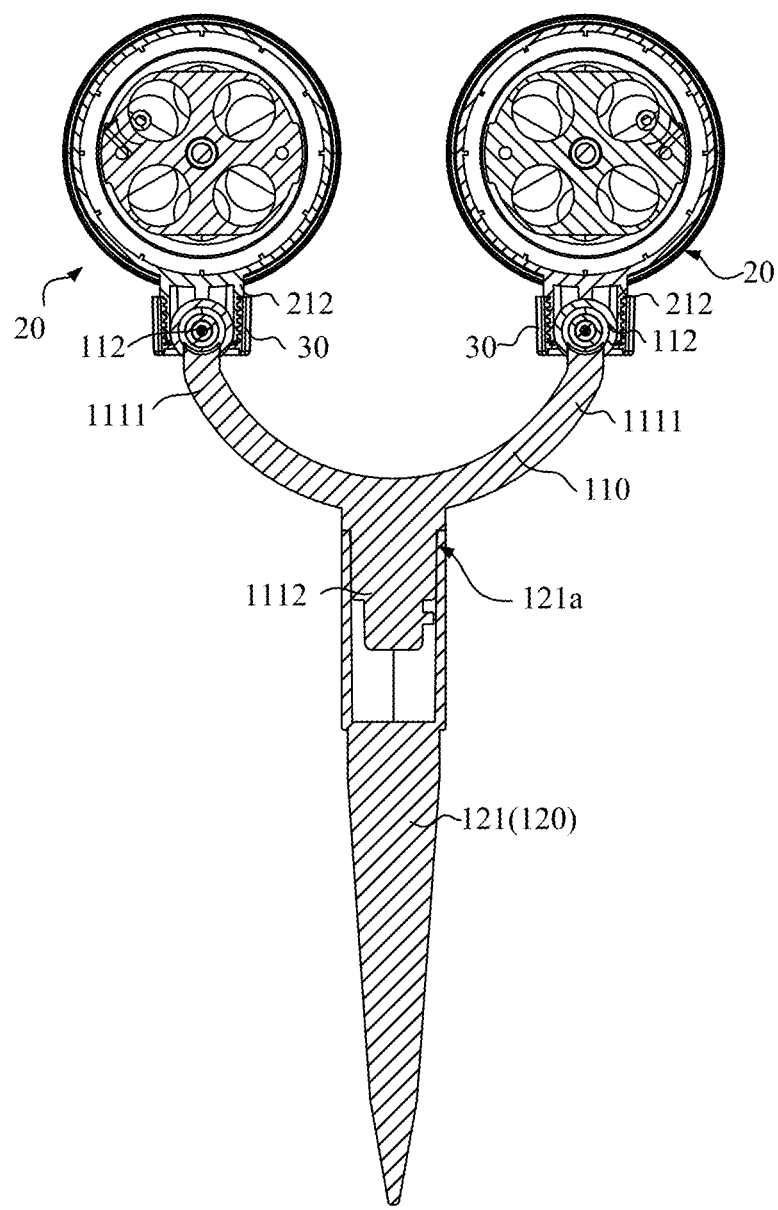
FIG. 2 is a cross-sectional schematic diagram of the projection device according to the first embodiment of the present disclosure.
Figure 3:
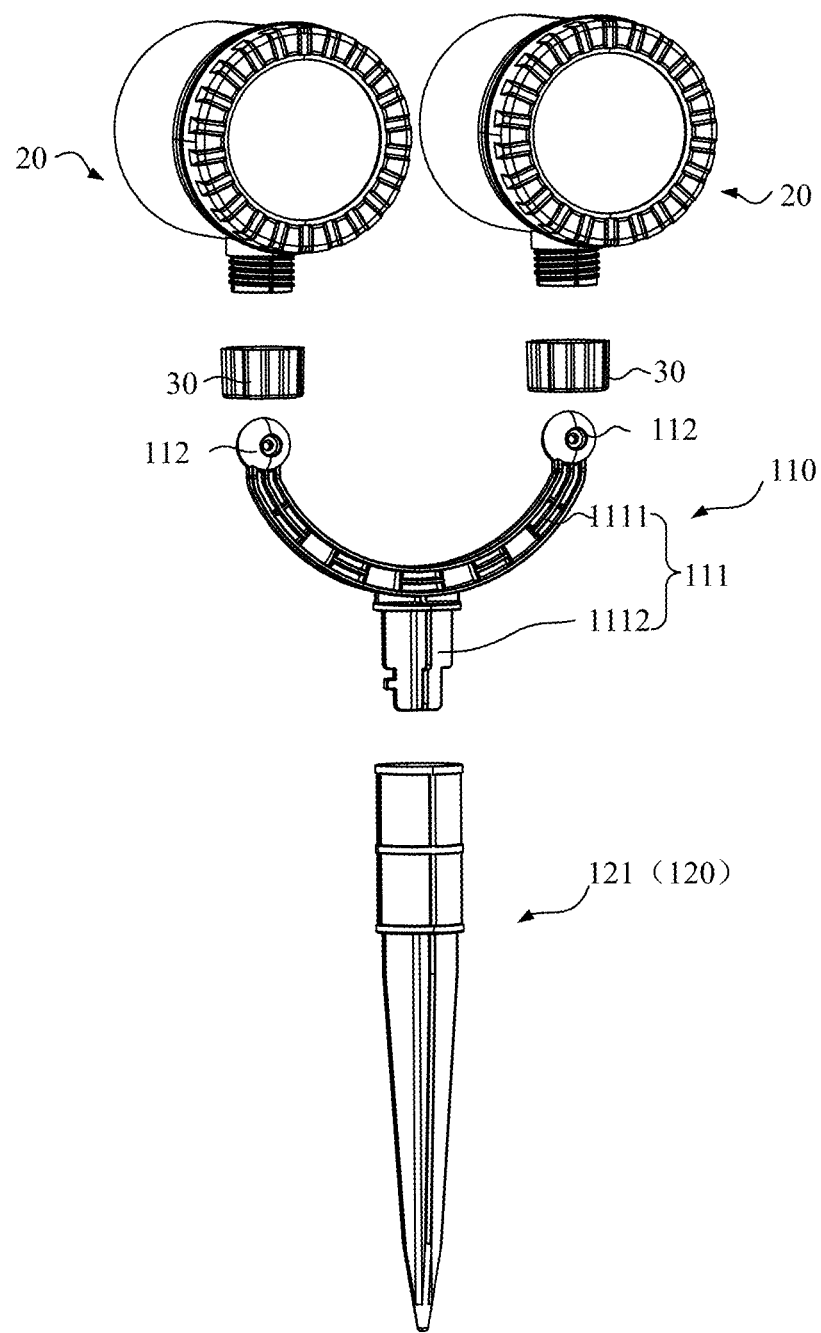
FIG. 3 is an exploded schematic diagram of the projection device according to the first embodiment of the present disclosure.
Figure 5:
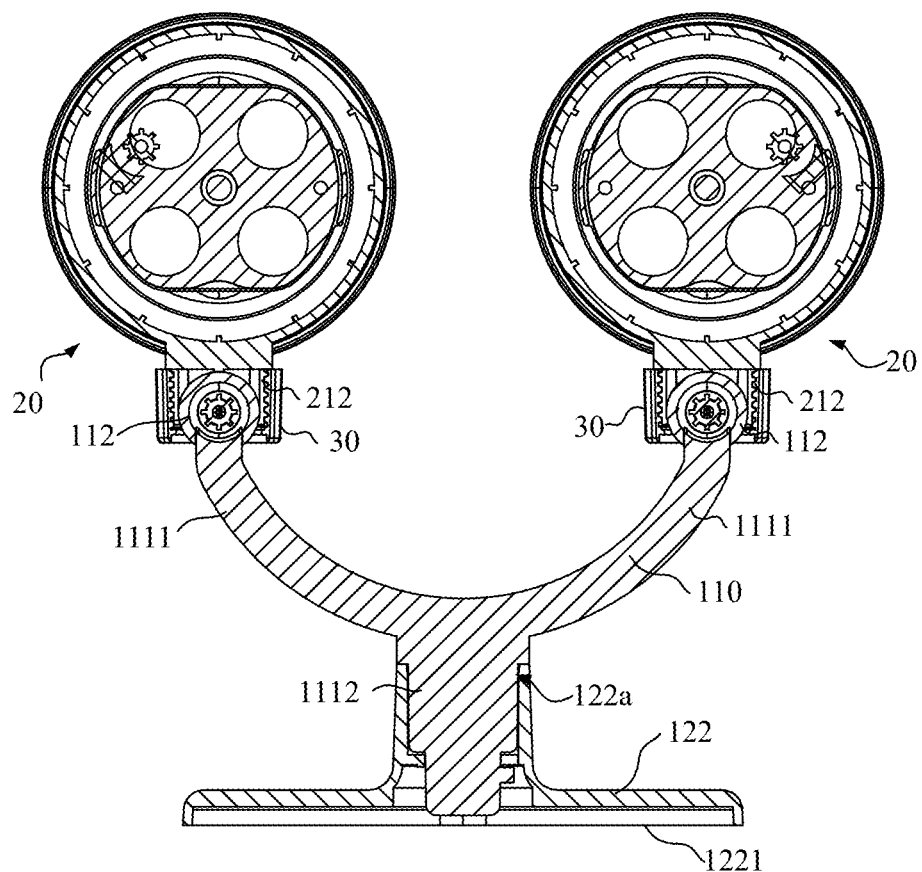
FIG. 5 is a cross-sectional schematic diagram of the projection device according to the second embodiment of the present disclosure.

As shown in FIGS. 2, 3, and 5, the base 10 comprises a connecting piece 110 and a fixing piece 120. The connecting piece 110 comprises the at least two connecting portions 1111 and a mounting portion 1112. The at least two connecting portions 1111 are connected to the mounting portion 1112. The fixing piece 120 is connected to the mounting portion 1112. The fixing piece 120 fixes the at least two projection lamps 20 to a mounting surface or an external device.

As shown in FIGS. 1-5, in some embodiment, the at least two connecting portions 1111 are two connecting portions. The connecting piece 110 further comprises a first connecting arm 1115. A middle portion of the first connecting arm 1115 is connected to the mounting portion 1112, and two opposite ends of the first connecting arm 1115 respectively form the two connecting portions 1111. In this way, stability of ta connection between the two connecting portions 1111 and the mounting portion 1112 is improved. Of course, in other embodiments, each of the connecting portions 1111 is formed by a single connecting arm, and each connecting arm is connected to the mounting portion 1112, or at least portions of adjacent connecting portions are connected together. Optionally, the first connecting arm 1115 is disposed in an arc shape, which increases a contact area with the mounting portion 1112 and has a higher aesthetic appearance. Of course, in other embodiments, the first connecting arm 1115 may be disposed in a V shape.

Figure 6:
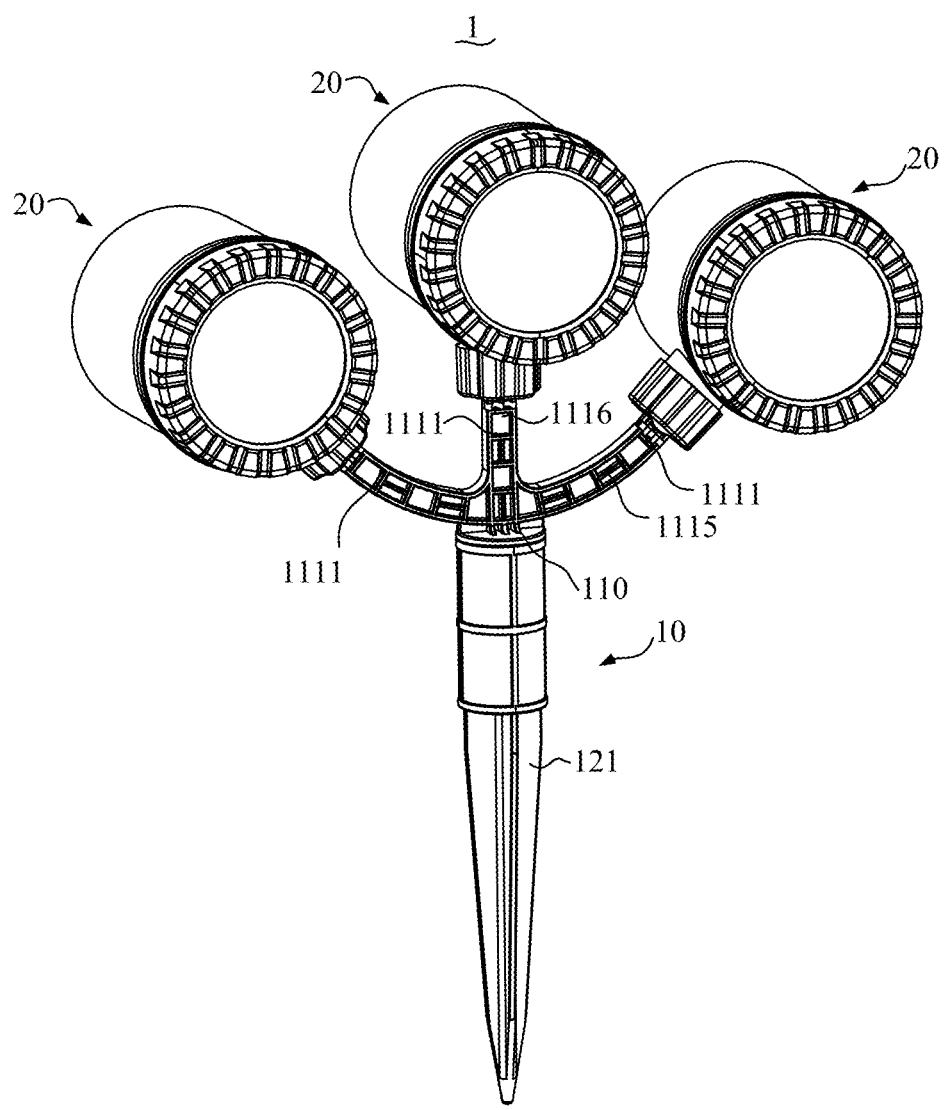
FIG. 6 is a schematic diagram of the projection device according to a third embodiment of the present disclosure.
Figure 7:
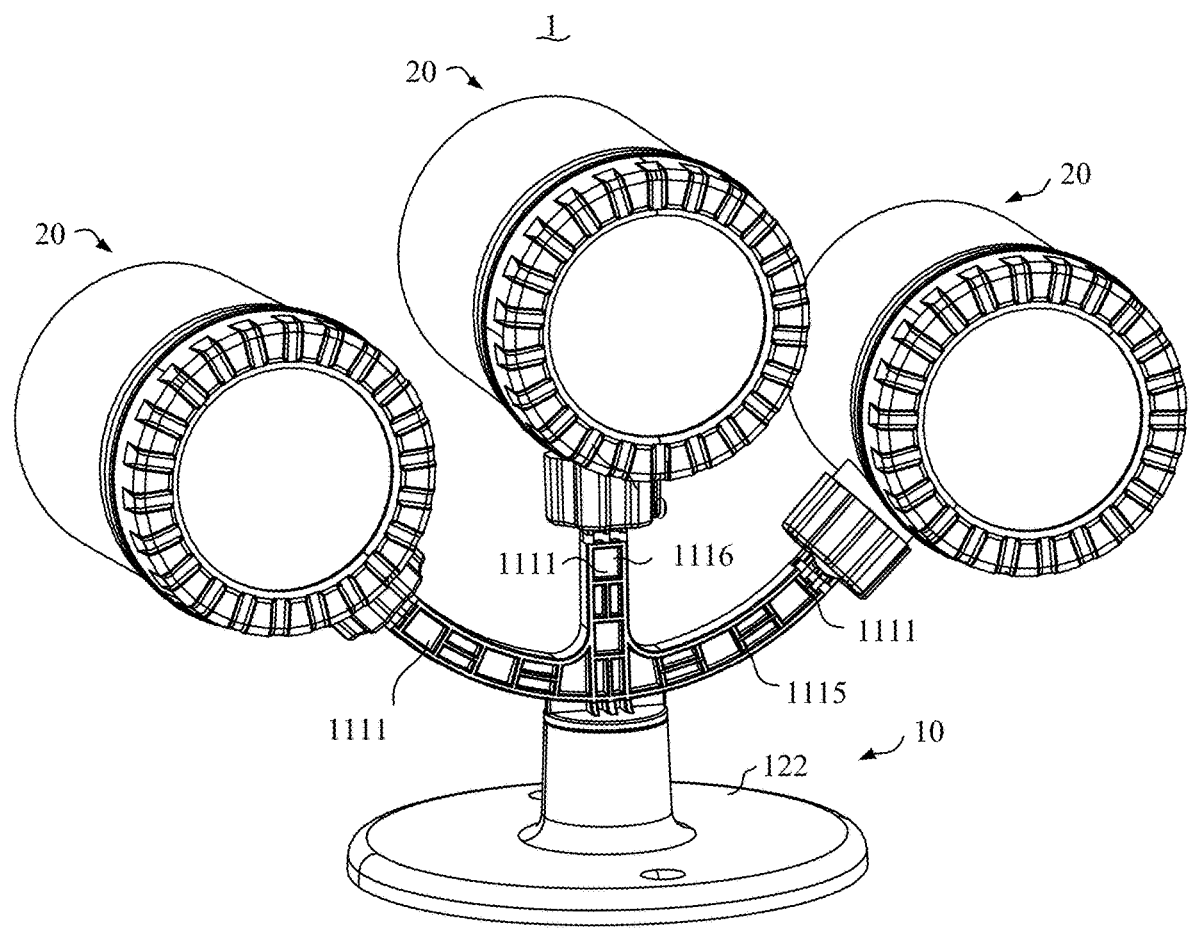
FIG. 7 is a schematic diagram of the projection device according to a fourth embodiment of the present disclosure.

As shown in FIGS. 6 and 7, in some embodiments, the at least two connecting portions are three connecting portions 1111. The connecting piece 110 further comprises a second connecting arm 1116. A first end of the second connecting arm 1116 is connected to a junction of the first connecting arm 1115 and the mounting portion 1112, and a second end of the second connecting arm 1116 forms a third one of the three connecting portions 1111. In this way, the three connecting portion 1111 are disposed on the connecting piece 110, so that three projection lamps 20 are allowed to be mounted.

Figure 8:
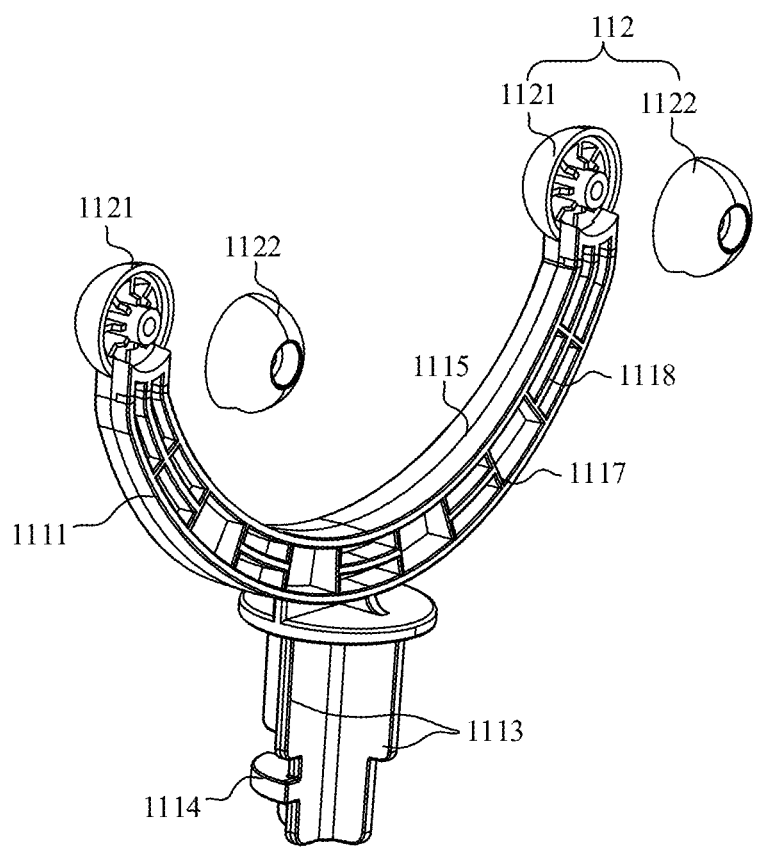
FIG. 8 is a schematic diagram of a connecting piece of the projection device according to the first embodiment of the present disclosure.

As shown in FIG. 8, in some embodiments, first reinforcing ribs 1117 spaced apart from each other are disposed in at least one of an extending direction of the first connecting arm 1115 and an extending direction of the second connecting arm 1116. Further, second reinforcing ribs 1118 spaced apart from each other are disposed in at least one of the extending direction of the first connecting arm 1115 and the extending direction of the second connecting arm 1116. The first reinforcing ribs 1117 and the second reinforcing ribs 1118 improve the rigidity and stability the first connecting 1115 arm and/or the second connecting arm 1116, prevent the first connecting 1115 arm and/or the second connecting arm 1116 from bending or deforming when subjected to an external force, and improve the stability of the at least two projection lamps 20.

It should be noted that the connecting piece 110 and the fixing piece 120 may be an integrally formed component. That is, the connecting piece 110 and the fixing piece 120 may be made of the same material (such as metal, plastic, etc.) through injection molding, casting, or other processes at one time. The integrally formed component has advantages of compact structure, simple manufacturing, and low cost. The connecting piece 110 and the fixing piece 120 may be separated structures, that is, the connecting piece 110 and the fixing piece 120 may be made of the same or different materials, the connecting piece 110 and the fixing piece 120 may be manufactured by the same or different manufacturing processes, and the connecting piece 110 and the fixing piece 120 may be detachably connected together, so that the fixing piece 120 is able to be replaced according to needs.

As shown in FIGS. 1-3 and 6, in some embodiments, the fixing piece 120 is a stake 121. A first end of the stake 121 defines a mounting hole 121a, and a second end of the stake 121 is inserted into the ground. The stake 121 provides a stable support point, which is convenient for fixing the at least two projection lamps 20 in different scenes, and effectively prevents the at least two projection lamps 20 from shaking or tilting during use. In addition, the at least two projection lamps 20 are able to be fixed at different heights by changing the stake 121 of different lengths, which is convenient for the user to use.

As shown in FIG. 8, the mounting portion 1112 comprises support sheets 1113. A first side of each of the support sheets 1113 is connected to first sides of other support sheets 1113 to form a common connecting area. Each two adjacent second sides of the support sheets 1113 defines an included angle and a plurality of included angle are formed. Sizes and directions of the plurality of included angles may be the same or different, but the plurality of included angles together form an outer contour that is approximately circular or annular. The support sheets 1113 are in interference fit with an inner wall of the mounting hole 121a. The interference fit connection is simple and firm, and the at least two projection lamps 20 are easily removed and remounted when the at least two projection lamps 20 need to be maintained or replaced.

Figure 4:
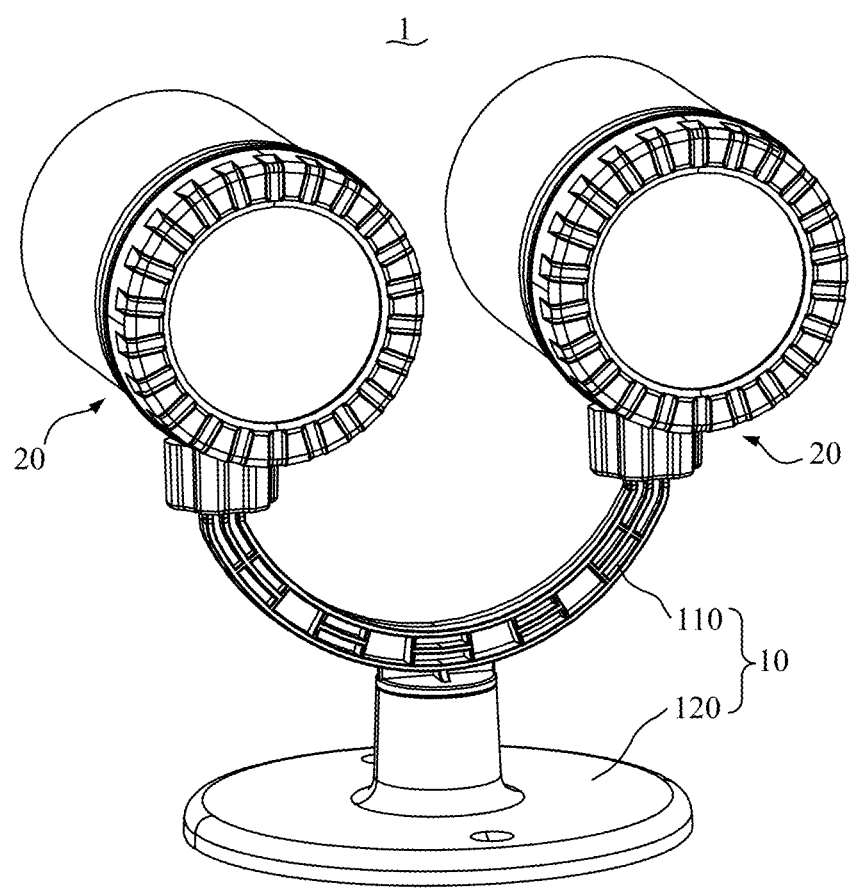
FIG. 4 is a schematic diagram of the projection device according to a second embodiment of the present disclosure.

As shown in FIGS. 4, 5, and 7, in some embodiments, the fixing piece 120 is a fixing base 122. The fixing base 122 defines a fixing surface 1221, and the fixing surface 1221 is disposed on the mounting surface (e.g., a desktop, a wall, a floor, etc.). A first rotating buckle 1114 is disposed on an outer wall surface of the mounting portion 1112. The fixing portion defines an assembling hole 122a. A second rotating buckle 1240 is disposed on a hole wall of the assembling hole 122a. The mounting portion 1112 is at least partially inserted into the assembling hole 122a. The first rotating buckle 1114 is engaged with the second rotating buckle 1240 by rotating. When assembly, the user only needs to insert the mounting portion 1112 into the assembling hole 122a and rotate the mounting portion 1112 to an appropriate position to achieve a secure connection. By such arrangement, no additional tool or fastening piece is required, thereby greatly improving mounting efficiency. Similar to the assembling process, during disassembly, the mounting portion 1112 and the fixing member 120 are easily separated by rotating, which facilitates maintenance and replacement of the projection device, thereby reducing maintenance costs and time.

Figure 9:
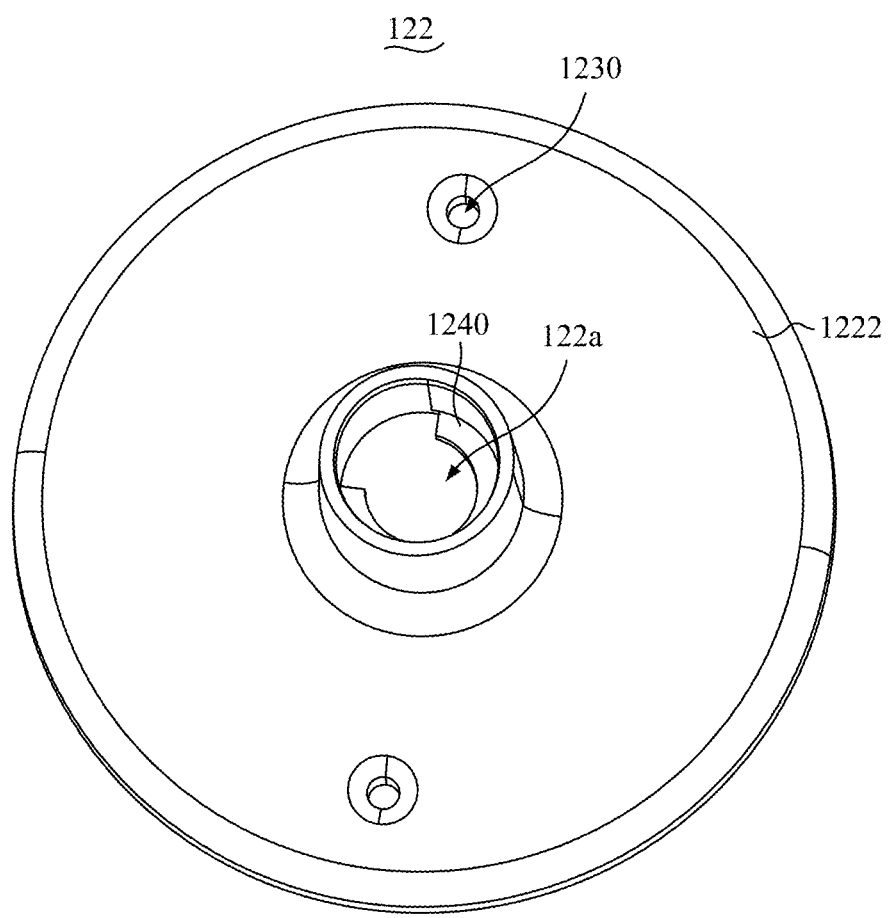
FIG. 9 is a schematic diagram of a fixing piece of the present disclosure.

As shown in FIG. 9, furthermore, the fixing base 122 comprises a fixing plate 1222. The fixing plate 1222 defines the fixing surface 1221 and a fixing hole 1230. A fastener (e.g., a bolt, a screw, etc.) is configured to pass through the fixing hole to fix the fixing plate 1222 to the mounting surface, which ensures a firm connection between the fixing base 122 and the mounting surface. A connection method thereof has high tensile strength and shear strength, is able to withstand large external forces and vibrations, and ensures the stability and safety of the at least two projection lamps 20.

Figure 10:
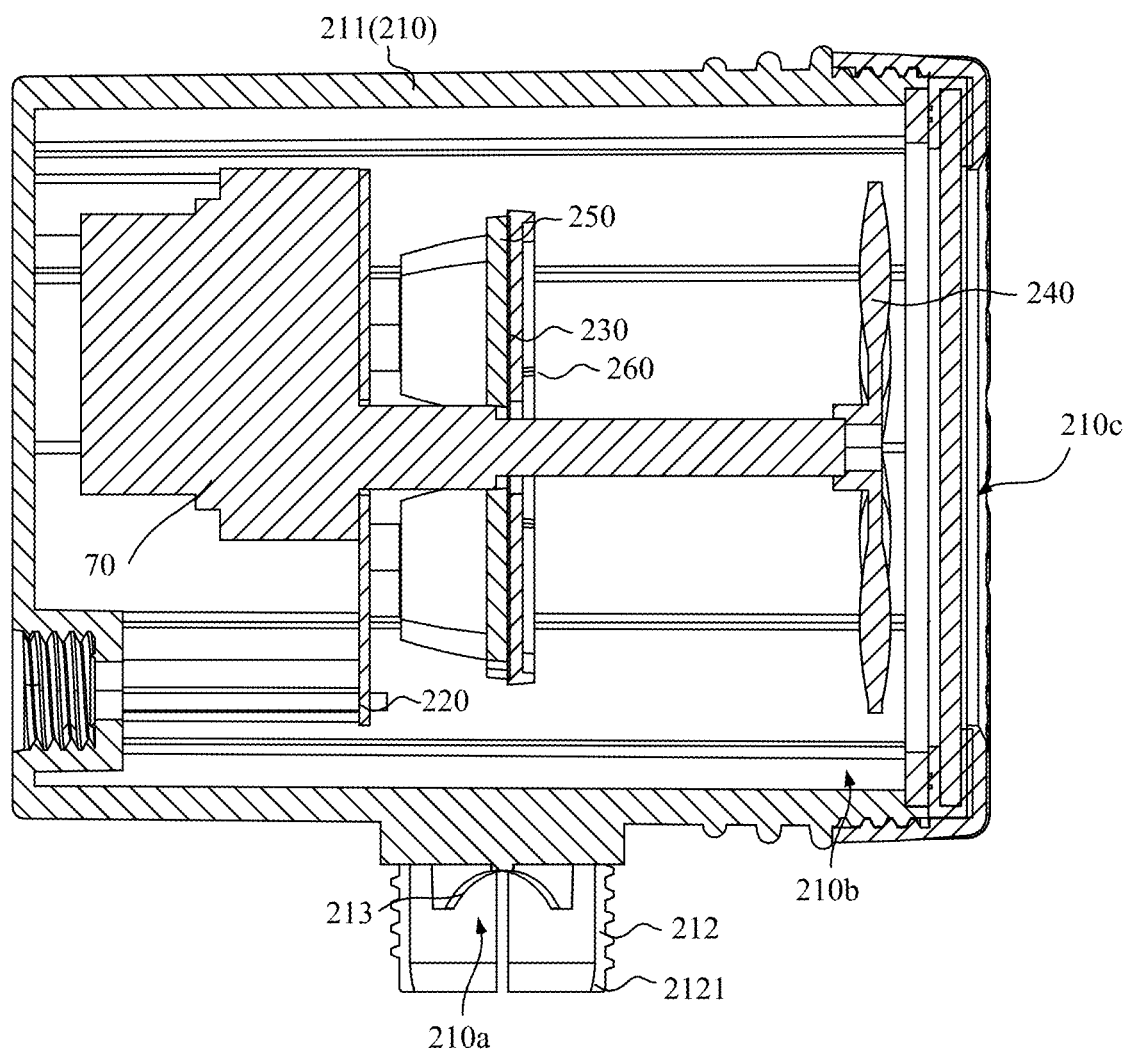
FIG. 10 is a cross-section schematic diagram of a projection lamp of the present disclosure.
Figure 11:
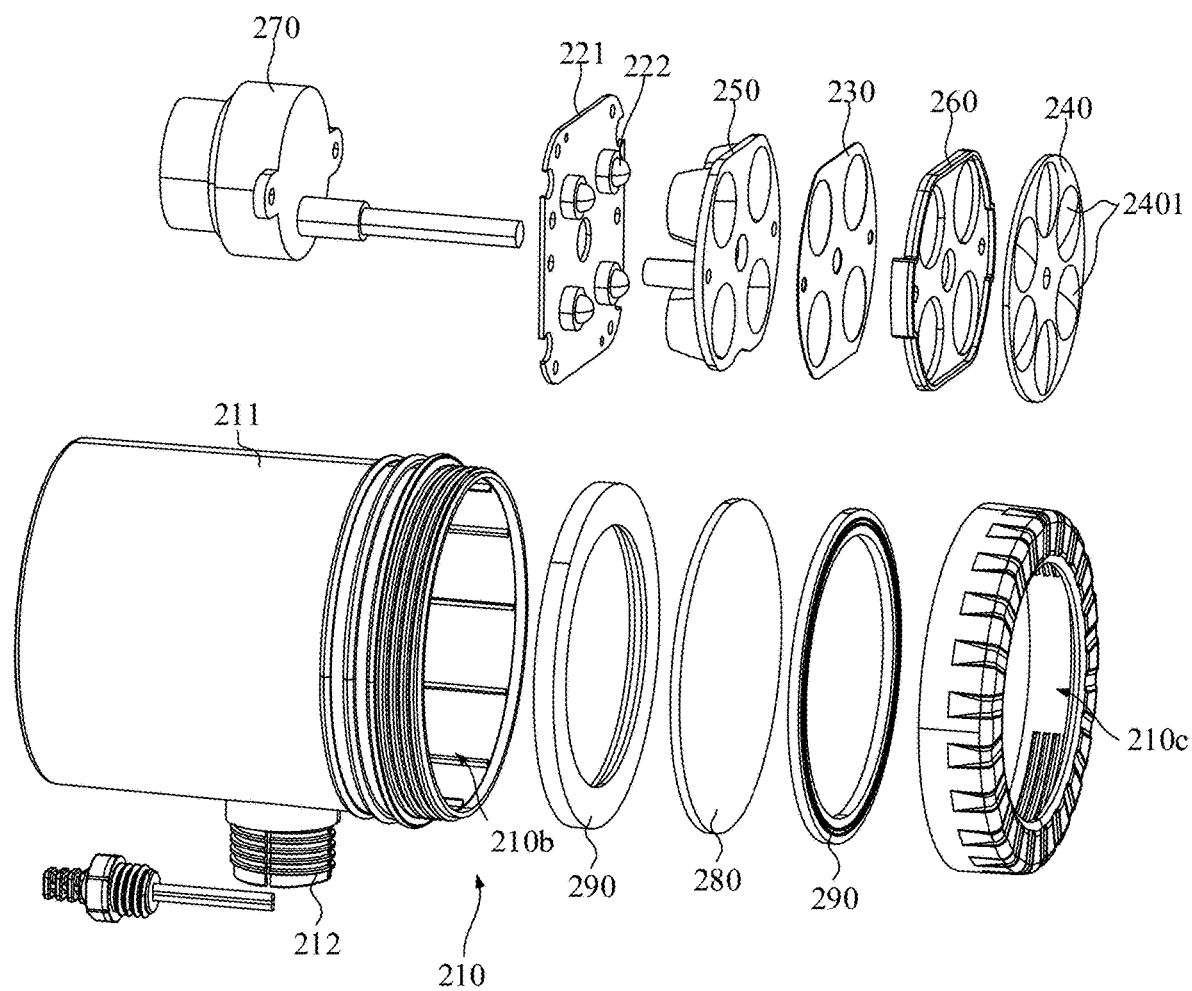
FIG. 11 is an exploded schematic diagram of a projection lamp of the present disclosure.

As shown in FIGS. 10-11, each of the projection lamps 20 comprises a housing 210, a lamp board 220, a projection element and a projection lens 240. The housing 210 thereof defines a mounting cavity 210b and a light-transmitting hole 210c. The light-transmitting hole 210c thereof is communicated with the mounting cavity 210b and an outside. The lamp board 220 thereof is mounted in the mounting cavity 210b thereof. The lamp board 220 thereof comprises at least one light source 222. The projection element thereof is mounted in the mounting cavity 210b thereof and is disposed in a light emitting direction of the at least one light source 222 thereof. The projection lens 240 thereof is mounted in the mounting cavity 210b thereof and is disposed in the light emitting direction of the at least one light source 222 thereof. Light emitted by the at least one light source 222 thereof passes through the projection element thereof, the projection lens 240 thereof and is emitted outward through the light-transmitting hole 210c thereof.

As shown in FIGS. 10-11, for ease of illustration, the present disclosure takes one of the least two projection lamps 20 as an example for further description. The housing 210 serves as an outer shell of the projection lamp 20, protecting internal components of the projection lamp 20 from interference from an external environment. Furthermore, protrusions are disposed on an outer surface of the housing 210 to increase a contact area between the housing 210 and air, thereby improving a heat dissipation effect. The housing 210 comprises a rear housing and a front housing. The rear housing defines an accommodating groove with an opening on one side, and the front housing is screwed with the rear housing and covers the opening of the accommodating groove. The front housing defines the light-transmitting hole 210c. A sealing glass plate 280 is mounted at the light-transmitting hole 210c to seal the mounting cavity 210b to prevent dust or water vapor from entering the mounting cavity 210b. Further, sealing rings 290 are disposed on two opposite sides of the sealing glass plate 280. That is, a first sealing ring 290 is disposed between the sealing glass plate 280 and the front housing, and a second sealing ring 290 is disposed between the sealing glass plate 280 and the rear housing after the front housing is fixed with the rear housing. In some embodiments, the housing 210 may comprise a rear cover, a middle housing, and a front cover. The middle housing is in a cylindrical structure with openings at two ends thereof. The rear cover and the front cover are respectively mounted at the two ends of the middle housing and cover the two openings of the middle housing. The front cover defines the light-transmitting hole 210c.

As shown in FIG. 11, the light panel 220 comprises a mounting plate 221 and light sources 222 mounted on the mounting plate 221. The light sources 222 may be LED lamp beads. The projection element may carry a specific image, image structure or text. The projection element may be a light sheet, a film, a liquid crystal light valve, etc. Specifically, the light emitted by the light sources 222 is converted into a light image after passing through the projection element, and the light image is directed to the projection lens 240. The projection lens 240 is configured to amplify the light image and project an amplified light image out (such as projecting the amplified light image onto a projection surface such as the ground, the wall, a curtain, etc. to form an projected image).

Furthermore, the projection lens 240 may comprise only a convex lens. In other embodiments, the projection lens 240 may include lenses. For example, the projection lens 240 comprises a first lens, a second lens, and a third lens coaxially disposed in sequence along the light emitting direction. The first lens and the third lens have positive optical power, and the second lens has negative optical power, which are not limited thereto. The structure and principle of the projection lens 240 have been disclosed in the relevant art, and are not depicted in details in the present disclosure.

As shown in FIGS. 10-11, in some embodiments, the projection lamp 20 further comprises a spotlight cup 250 mounted on the lamp board 220 and disposed in the light emitting direction of the light sources 222 The projection element is mounted on one side, away from the light sources 222, of the spotlight cup 250. The spotlight cup 250 and the mounting plate 221 are connected by screws. The spotlight cup 250 is also called as a reflective cup, a focusing reflector, a light cup, etc. The spotlight cup 250 is configured to reflect and focus the light, and has a an entrance and exit opposite to the entrance. A size of the entrance is less than a size of the exit, so that a focusing cavity defined inside the spotlight cup 250 is of a trapezoidal structure. In addition, a reflective layer is disposed on an inner wall surface of the spotlight cup 250 to reflect light to reflect and focus incident light, so that outgoing light is roughly uniformly emitted in parallel. In this way, a divergence range of the emitted light is reduced, forming a small-angle light with good brightness and uniformity, so that the emitted light passes through the projection element and the projection lens 240 as much as possible, forming a better projection image.

It should be noted that the reflective layer may be a reflective coating evenly coated on the inner wall surface of the spotlight cup 250. The reflective layer may also be a reflective film attached to the inner wall surface of the spotlight cup 250. Alternatively, a reflective material (such as aluminum, silver, silicon dioxide, etc.) is deposited on the inner wall surface of the spotlight cup 250 through evaporation, magnetron sputtering, physical vapor deposition, chemical vapor deposition, or other coating techniques to form the reflective layer on the inner wall surface of the spotlight cup 250.

As shown in FIGS. 10-11, in some embodiments, the projection element is a projection film 230. The projection lamp 20 further comprises a pressing plate 260. The pressing plate 260 is fixedly connected to the spotlight cup 250 to press the projection film 230 on the spotlight cup 250. The pressing plate 260 is fixedly connected to the spotlight cup 250, and the pressing plate 260 firmly presses the projection film 230 onto the spotlight cup 250, preventing the projection film 230 from moving or loosening during a projection process, ensuring clarity and stability of the projected image, and avoiding image distortion or blurring caused by position changes of the projection film 230. The pressing plate 260 is fixedly connected to the spotlight cup 250, which further ensures that a contact between the projection film 230 and the spotlight cup 250 is tight and uniform, thus reducing leakage or scattering of light between the projection film 230 and the spotlight cup 250, improving the utilization rate of light, and improving the projection effect.

It is understood that the projection film 230 comprises image structures. The pressing plates defies restrict holes corresponding to the image structures. The pressing plate 260 and the spotlight cup 250 press an edge of the projection film 230, which ensures that the image structures remains flat during the projection process and avoid image distortion or blurring caused by curling or deformation of the projection film 230. In addition, the restrict holes prevent the light from being reflected or scattered inside the pressing plate 260, so light utilization efficiency is not reduced, and darkening of the projected image or an appearance of light spots are avoided. The pressing plate 260 is made of polymethyl methacrylate (PMMA), polystyrene (PS), polycarbonate (PC) or glass, which have high light transmittance, good heat resistance and impact resistance.

As shown in FIG. 11, in some embodiments, the light sources 222 222 are mounted on the mounting plate 221, the projection film 230 comprises the image structures, and the projection lens 240 comprises focusing portions 2401. The light sources 222 are one-to-one corresponding to the image structures in the light emitting direction. The focusing portions 2401 are one-to-one corresponding to the light sources 222. It should be noted that the focusing portions 2401 are raised structures disposed on the projection lens 240. The projection lamp 20 further comprises a motor 270 A main body of the motor 270 is mounted on a rear portion of the mounting plate 221. A driving shaft of the motor 270 passes through the mounting plate 221 and is rotatably connected to the projection lens 240. The light sources 222, the image structures, and the focusing portions 2401 are circumferentially disposed in a circumferential direction of the driving shaft. The motor 270 drives the projection lens 240 to rotate, so that light image that is originally static presents a dynamic effect, increasing interest and ornamental value of the projected image. Furthermore, parameters such as a rotating speed, a direction, and a rotating time of the motor 270 are controlled by programming, so that the projection lamp 20 is able to perform dynamic projection according to a preset animation effect to meet diverse application needs.

Furthermore, the mounting plate 221 of the lamp board 220 is a circuit board, and the projection lamp 20 further comprises a conductive wire, a first end of the conductive wire is electrically connected to the circuit board and a second end of the conductive wire is connected to a plug, so that the light sources 222 and the motor 270 are powered by an external power supply.

Remaining structures of the projection device 1 are introduced below.

In some embodiments, the at least two projection lamps 20 are respectively rotatably connected to the at least two connecting portions 1111, which allows the at least two projection lamps 20 to rotate freely in different directions, so that projection angles and positions thereof are easily adjusted.

In some embodiments, the at least two connecting portions 1111 comprise connection positions respectively connected to the at least two projection lamps 20. In a front-rear direction of the projection device 1, the connection positions are located on a same plane. Since the at least two projection lamps 20 are located on the same plane, projection lights of the at least two projection lamps 20 are not blocked by each other, ensuring that each of the projection lamps 20 is able to independently and completely display the projected image or a light effect thereof. In addition, since light blocking is avoided, there is no need to frequently adjust a position or an angle of each of the projection lamps 20 during a debugging process, thereby saving debugging time.

As shown in FIGS. 2, 3, and 8, in some embodiments, the connecting piece 110 further comprises spherical portions 112. Each of the spherical portions 112 are connected to one end of a corresponding one of the at least two connecting portions 1111. Each housing 210 define a mounting groove 210a, and a groove wall of each mounting groove 210a is spherical. The projection device 1 of the present disclosure further includes mounting pieces 30. Each of the mounting pieces 30 defines a through hole 30a. An aperture of each through hole 30a is less than an outer diameter of each of the spherical portions 112. Each of the mounting pieces 30 is detachably connected to each housing 210 to rotatably connect each of the spherical portions 112 in each mounting groove 210a. Each of the connecting portions 1111 extends outward from each through hole 30a.

Each of the spherical portions 112 is connected to the one end of the corresponding one of the at least two connecting portions 1111 and is rotatably fixed in the mounting groove 210a of each housing 210, so that each of the connecting portions 1111 is rotatable freely within a certain range, and the projection angle of each of the projection lamps 20 is easily adjusted, realizing multi-angle projection and meeting needs of different scenes. In addition, the groove wall of each mounting groove 210a is spherically disposed, which is tightly matched with each of the spherical portions 112, ensuring the stability of the connecting piece 110 during a rotating process. Each of the mounting pieces 30 defines the through hole 30a, and the aperture of each through hole 30a is less than the outer diameter of each of the spherical portions 112, which effectively prevents the spherical portions 112 from falling off during the assembly process and improves the reliability of a connection thereof.

As shown in FIG. 8, in some embodiments, the connecting piece 110 comprises a main body portion 111 and hemispherical coves 1122. The main body portion 111 comprises the mounting portion 1112, the at least two connecting portions 1111, and hemispherical portions 1121 respectively connected to the at least two connecting portions 1111. The hemispherical covers 1122 are respectively detachably connected to the hemispherical portions 1121 to form the spherical portions 112. It is understood that, since the aperture of the through hole 30a of each of the mounting pieces 30 is less than the outer diameter of each of the spherical portions 112, a complete spherical portion 112 is unable to directly pass through each through hole 30a. At this time, each of the hemispherical portions 1121 (as a part of each of the spherical portions 112) passes through each through hole 30a first. After each of the hemispherical portions 1121 passes through each through hole 30a, each of the hemispherical covers 1122 is relatively fixed to each hemispherical portion 1121 to form each spherical portion 112. Such a step-by-step mounting method makes the assembly process simpler and solves a problem that each of the spherical portions 112 is unable to pass through each through hole 30a because the spherical portions 112 are too large as a whole. Of course, in other embodiments, each of the mounting pieces 30 may be separate structures. For instance, each of the mounting pieces 30 is designed as two parts, and the two parts are enclosed and fixed as a whole on two sides of each of the connecting portions 1111, which is not limited thereto.

Optionally, the hemispherical covers 1122 are respectively connected to the hemispherical portions 1121 through screws, a connection method thereof is simple and has high stability. Of course, in other embodiments, a snap-on connection method may be adopted to connected the hemispherical covers 1122 and the hemispherical portions 1121.

Alternatively, the housing 210 of each of the projection lamp 20 is connected to each of the spherical portions 112, and each mounting groove 210 a is formed at the one end of the corresponding one of the at least two connecting portion 1111 The present disclosure does not limit the specific connection method of the at least two projection lamps 20 and each housing 210 thereof.

As shown in FIGS. 10-11, each housing 210 comprises a housing body 211 and arc-shaped connecting plates 212. The arc-shaped connecting plates 212 thereof are disposed around and connected to an outer wall of the housing body 211 thereof to define the mounting groove 210a thereof. The arc-shaped connecting plates 212 of each housing 210 are disposed at intervals so that the arc-shaped connecting plates 212 undergo a certain degree of elastic deformation when subjected to the external force. When each of the spherical portion 112 enters each mounting groove 210a, corresponding arc-shaped connecting plates 212 expand slightly outward to match with an outer diameter of each of the spherical portions 112, thereby ensuring that each of the spherical portions 112 is allowed to be smoothly embedded in each mounting groove 210a. A necking portion 2121 is disposed at one end of the arc-shaped connecting plates 212 away from a corresponding housing 210. Each necking portion 2121 plays a role of a "clip". Once each of the spherical portions 112 completely enters each mounting groove 210a, each necking portion 2121 tightly hold each of the spherical portions 112 to prevent it from accidentally detaching from each mounting groove 210a. Optionally, the mounting pieces 30 comprise internal threads, the arc-shaped connecting plate 212 of each housing comprises outer threads, and the internal threads are respectively screwed with the outer threads. On one hand, the threads make the projection device 1 easy to disassemble, and on the other hand, each of the mounting pieces 30 provides a support force to the corresponding arc-shaped connecting plates on outer sides of the corresponding arc-shaped connecting plates 212, thereby improving the stability of the arc-shaped connecting plates 212 in fixing the spherical portions 112.

Figure 12:
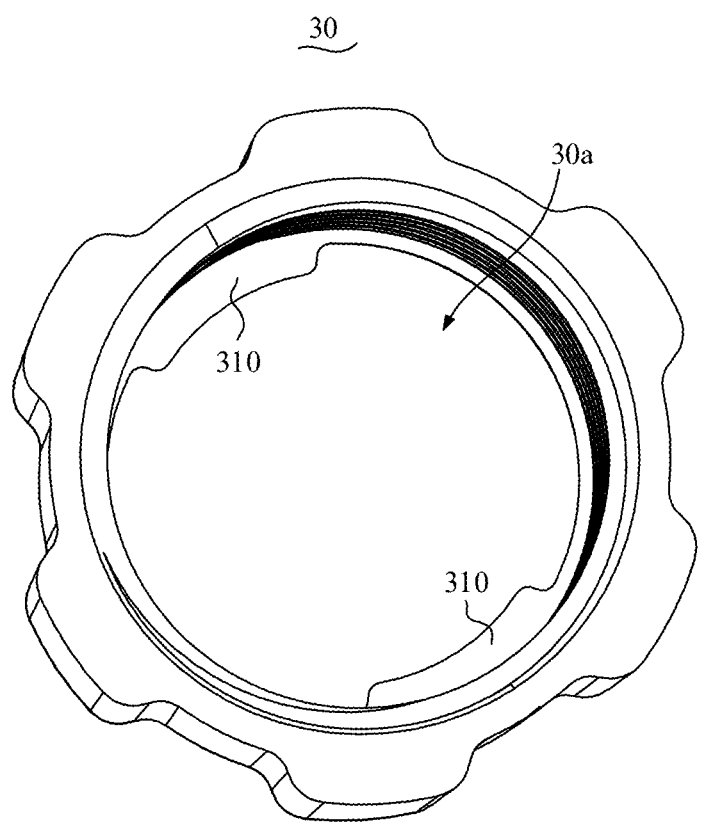
FIG. 12 is a schematic diagram of a mounting piece of the present disclosure.

As shown in FIG. 12, furthermore, arc-shaped limiting portions 310 protruding inward are disposed on two opposite sides of an inner wall of each through hole 30a. The arc-shaped limiting portions 310 of each of the mounting pieces 30 limit a rotation range of each of the spherical portions 112 in each mounting groove 210a, preventing each of the spherical portions 112 from excessive rotation or deviation from a predetermined position, ensuring stability and accuracy of each of the projection lamps 20 after mounting, and avoiding projection deviation or equipment damage caused by improper rotation.

In some embodiments, each housing 210 further comprises support ribs 213. The support ribs 213 thereof are connected to the housing body 211 thereof and inner walls of the arc-shaped connection plates thereof. Outer surfaces of the support ribs 213 thereof are disposed in arc shapes to form the groove wall of each mounting groove 210a. The support ribs 213 thereof are connected to an inner wall of each housing body 211 and inner wall of corresponding arc-shaped connecting plates 212, which improve the stability of the connection between each housing body 211 and the corresponding arc-shaped connecting plate 212. The support ribs 213 of each housing 200 form the mounting groove 210a of a spherical shape. Further, the support ribs 213 of each housing 210 provide uniform support force, reduce deformation and damage risks of each housing 210 when subjected to the external force.

In the drawings of the embodiments, the same or similar numbers correspond to the same or similar components. In the description of the present disclosure, it should be understood that terms such as "upper", "lower", "left", "right" etc. indicate direction or position relationships shown base 10d on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A projection device, comprising: at least two projection lamps; and a base; wherein the base comprises at least two connecting portions, the at least two connecting portions extend in different directions, and at least one of the at least two projection lamps is disposed on each of the connecting portions; wherein a connecting piece comprises the at least two connecting portions and a mounting portion, the at least two connecting portions are connected to the mounting portion, the connecting piece further comprises spherical portions and mounting pieces, each of the spherical portions are connected to one end of a corresponding one of the at least two connecting portions; wherein each of the projection lamps comprises a housing, each housing define a mounting groove, and a groove wall of each mounting groove is spherical; wherein each of the mounting pieces defines a through hole, an aperture of each through hole is less than an outer diameter of each of the spherical portions, each of the mounting pieces is detachably connected to each housing to rotatably connect each of the spherical portions in each mounting groove, and each of the connecting portions extends outward from each through hole; and wherein the connecting piece comprises a main body portion and hemispherical coves; wherein the main body portion comprises the mounting portion, the at least two connecting portions, and hemispherical portions respectively connected to the at least two connecting portions; wherein the hemispherical covers are respectively detachably connected to the hemispherical portions to form the spherical portions.

2. The projection device according to claim 1, wherein the base further comprises a fixing piece, the fixing piece is connected to one end of the mounting portion away from the at least two projection lamps, and the fixing piece fixes the at least two projection lamps to a mounting surface or an external device.

3. The projection device according to claim 2, wherein the at least two projection lamps are respectively rotatably connected to the at least two connecting portions.

4. The projection device according to claim 3, wherein the at least two connecting portions comprise connection positions respectively connected to the at least two projection lamps;
wherein in a front-rear direction of the projection device, the connection positions are located on a same plane.

5. The projection device according to claim 1, wherein the hemispherical covers are respectively connected to the hemispherical portions through screws.

6. The projection device according to claim 1, wherein each housing comprises a housing body and arc-shaped connecting plates, and the arc-shaped connecting plates thereof are disposed around and connected to an outer wall of the housing body thereof to define the mounting groove thereof;
wherein the arc-shaped connecting plates are disposed at intervals, and a necking portion is disposed at one end of the arc-shaped connecting plates away from a corresponding housing, so that an outer diameter of an opening of each mounting groove is less than the outer diameter of each of the spherical portions, arc-shaped limiting portions protruding inward are disposed on two opposite sides of an inner wall of each through hole.

7. The projection device according to claim 6, wherein inner threads are disposed on the mounting pieces, outer threads are disposed on the arc-shaped connecting plates, and the inner threads are respectively screwed with the outer threads.

8. The projection device according to claim 6, wherein each housing further comprises support ribs, the support ribs thereof are connected to the housing body thereof and inner walls of the arc-shaped connection plates thereof, and outer surfaces of the support ribs thereof are disposed in arc shapes to form the groove wall of each mounting groove.

9. The projection device according to claim 2, wherein the fixing piece is a stake, the stake defines a mounting hole, the mounting portion comprises support sheets, first sides of each of the support sheets are connected to each other, each two adjacent second sides of the support sheets defines an included angle, and the support sheets are in interference fit with an inner wall of the mounting hole.

10. The projection device according to claim 2, wherein the fixing piece is a fixing base, the fixing base defines a fixing surface, and the fixing surface is disposed on the mounting surface, a first rotating buckle is disposed on an outer wall surface of the mounting portion, the fixing portion defines an assembling hole, a second rotating buckle is disposed on a hole wall of the assembling hole, the mounting portion is at least partially inserted into the assembling hole, and the first rotating buckle is engaged with the second rotating buckle by rotating.

11. The projection device according to claim 10, wherein the fixing base comprises a fixing plate, the fixing plate defines the fixing surface and a fixing hole, and the fixing hole is configured for a fastener to pass through, so that the fixing plate is fixed to the mounting surface.

12. The projection device according to claim 2, wherein each of the projection lamps comprises a housing, a lamp board, a projection element, and a projection lens;
wherein the housing thereof defines a mounting cavity and a light-transmitting hole, the light-transmitting hole thereof is communicated with the mounting cavity and an outside, the lamp board thereof is mounted in the mounting cavity thereof, the lamp board thereof comprises at least one light source; the projection element thereof is mounted in the mounting cavity thereof and is disposed in a light emitting direction of the at least one light source thereof; the projection lens thereof is mounted in the mounting cavity thereof and is disposed in the light emitting direction of the at least one light source thereof, and light emitted by the at least one light source thereof passes through the projection element thereof, the projection lens thereof and is emitted outward through the light-transmitting hole thereof.

13. The projection device according to claim 12, wherein each of the projection lamps further comprises a spotlight cup mounted on the lamp board thereof and disposed in the light emitting direction of the at least one light source thereof, and the projection element thereof is mounted on one side, away from the at least one light source, of the spotlight cup thereof.

14. The projection device according to claim 13, wherein the projection element thereof is a projection film, each of the projection lamps further comprises a pressing plate, and the pressing plate thereof is fixedly connected to the spotlight cup thereof to press the projection element thereof on the spotlight cup thereof.

15. The projection device according to claim 12, wherein the least one light source comprises light sources, the projection element thereof comprises image structures, the projection lens thereof comprises focusing portions, the light sources are one-to-one corresponding to the image structures, and the focusing portions are one-to-one corresponding to the light sources,
- wherein each of the projection lamps further comprises a motor, a main body of the motor thereof is mounted on a rear portion of the lamp board thereof, and a driving shaft of the motor thereof passes through the lamp board thereof and is rotatably connected to the projection lens thereof;
- wherein the light sources thereof, the image structures thereof, and the focusing portions thereof are circumferentially disposed in a circumferential direction of the driving shaft thereof.

16. The projection device according to claim 2, wherein the connecting piece further comprises a first connecting arm, a middle portion of the first connecting arm is connected to the mounting portion, and two opposite ends of the first connecting arm respectively form two connecting portions of the at least two connecting portions, and the first connecting arm is disposed in an arc shape.

17. The projection device according to claim 16, wherein the connecting piece further comprises a second connecting arm, a first end of the second connecting arm is connected to a junction of the first connecting arm and the mounting portion, and a second end of the second connecting arm forms one connecting portion of the at least two connecting portions.

18. The projection device according to claim 17, wherein first reinforcing ribs spaced apart from each other are disposed in at least one of an extending direction of the first connecting arm and an extending direction of the second connecting arm; and/or
- second reinforcing ribs spaced apart from each other are disposed in at least one of the extending direction of the first connecting arm and the extending direction of the second connecting arm.

* * * * *